United States Patent
Birdsong, Jr. et al.

(10) Patent No.: US 7,990,308 B2
(45) Date of Patent: Aug. 2, 2011

(54) MIRROR IMAGE TARGET DETECTION AND RECOGNITION

(75) Inventors: Frank A. Birdsong, Jr., Alexandria, VA (US); Lloyd E. Kinsey, Jr., Tucson, AZ (US)

(73) Assignee: Raytheon Company, Waltham, MA (US)

( * ) Notice: Subject to any disclaimer, the term of this patent is extended or adjusted under 35 U.S.C. 154(b) by 391 days.

(21) Appl. No.: 12/390,331

(22) Filed: Feb. 20, 2009

(65) Prior Publication Data
US 2010/0214154 A1   Aug. 26, 2010

(51) Int. Cl.
*G01S 7/41* (2006.01)
(52) U.S. Cl. .......................................... 342/90; 342/196
(58) Field of Classification Search ........... 342/90, 342/188, 189, 192, 195, 196
See application file for complete search history.

(56) References Cited

U.S. PATENT DOCUMENTS

| | | | |
|---|---|---|---|
| 4,490,718 A * | 12/1984 | Opitz et al. | 342/192 |
| 5,381,154 A * | 1/1995 | Guerci | 342/90 |
| 5,497,158 A * | 3/1996 | Schmid et al. | 342/90 |
| 5,561,431 A * | 10/1996 | Peele et al. | 342/90 |
| 5,867,118 A * | 2/1999 | McCoy et al. | 342/90 |
| 5,990,823 A * | 11/1999 | Peele et al. | 342/90 |
| 6,094,157 A * | 7/2000 | Cowdrick | 342/22 |
| 6,437,728 B1 * | 8/2002 | Richardson et al. | 342/90 |
| 7,002,509 B2 * | 2/2006 | Karlsson | 342/90 |
| 2005/0156780 A1 * | 7/2005 | Bonthron et al. | 342/107 |
| 2010/0214154 A1 * | 8/2010 | Birdsong et al. | 342/90 |

OTHER PUBLICATIONS

Hanying Zhou and Tien-Hsin Chao, Mach filter synthesizing for detecting targets in cluttered environment for gray-scale optical correlator, 5 pages, California Institute of Technology, Pasadena, CA.
SAIC, Corp, Xpatch(R) Electromagnetic Simulation Software, 1 page, http://www.saic.com/products/software/xpatch, San Diego, CA.

* cited by examiner

*Primary Examiner* — John B Sotomayor
(74) *Attorney, Agent, or Firm* — SoCal IP Law Group LLP; John E. Gunther; Steven C. Sereboff

(57) ABSTRACT

There is disclosed a system and method for detecting targets. A transmitter may transmit a first inverse transform signal, the first inverse transform signal derived from a reference image of a first reference target at a first aspect angle. A receiver may receive a return signal reflected from a scene. A detector may determine, based on the return signal, if an object similar to the first target at the first aspect angle is detected within the scene.

16 Claims, 5 Drawing Sheets

MIRROR IMAGE TARGET DETECTION AND RECOGNITION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to detecting and identifying targets using a radar system.

2. Description of the Related Art

Radar systems typically transmit an RF signal and receive a portion of the RF signal returned or reflected from targets and other objects. While radars may transmit a wide variety of signals, a common form of radar transmits a narrow beam of RF energy, typically within the microwave or millimeter wave portions of the electromagnetic spectrum. A target is typically detected by monitoring the amplitude of a return signal reflected or scattered from the target. Some radar systems determine the velocity of a target from the frequency difference between the transmitted RF signal and the return signal due to the Doppler effect. Other radar systems transmit a pulsed RF signal and determine the distance to a target from the elapsed time between a transmitted pulse and a returned pulse.

The return signal received from a typical target, such as a weapon or a vehicle, may differ substantially, in both the time domain and the frequency domain, from the transmitted RF signal. Some conventional radar systems attempt to recognize or identify the type of a target from the time-frequency characteristics of the returned pulses. A typical radar system with automatic target recognition converts the return signal to digital form and then extracts time-frequency information. For example, the frequency spectrum, as a function of time, of the returned pulses may be calculated using a windowed Fourier transform or other computational technique. The time-frequency characteristics of the return signal may then be matched with the time-frequency characteristics of a plurality of known objects. Numerical comparison, vector distance calculation, correlation, and/or other analytical techniques may be used to determine a degree of similarity between the extracted time-frequency information and the time-frequency characteristics of the known objects. A target may be considered to be identified if the degree of similarity with a known object exceeds a predetermined threshold. Such conventional automatic target recognition requires substantial and costly processing capability in the radar receiver.

DETAILED DESCRIPTION

Description of Apparatus

Figure 1:
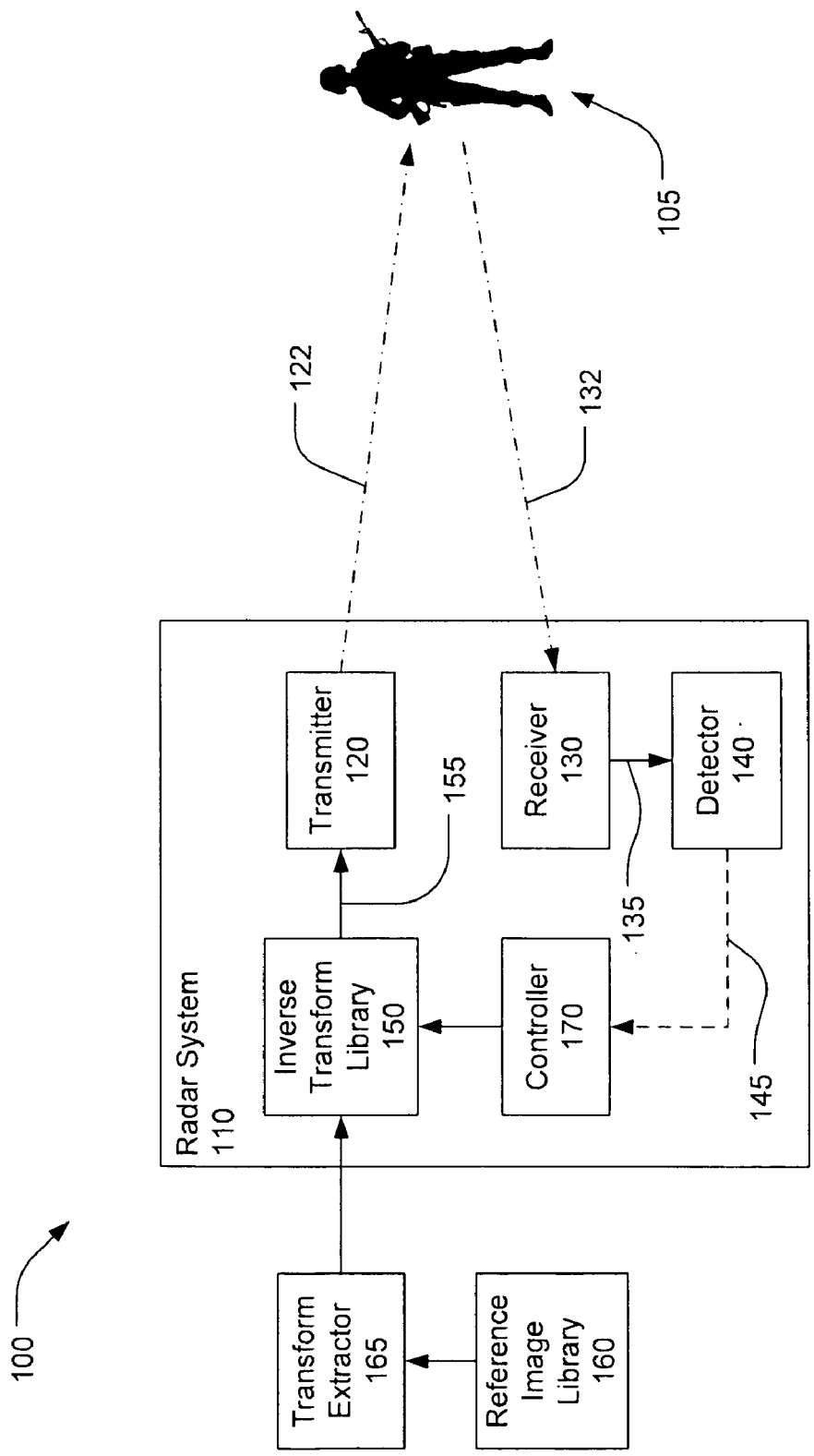
FIG. 1 is a block diagram of a system for identifying targets.

Referring now to FIG. 1, a system for identifying targets 100 using mirror image detection and recognition may include a radar system 110. The radar system 110 may include a transmitter 120 to transmit a radio-frequency signal 122 and a receiver 130 to receive a return signal 132 scattered, or reflected, from a scene which may contain a target 105. The transmitter 120 and receiver 130 may be coupled to separate antennas or a common antenna, which is not shown in FIG. 1.

The transmitted radio frequency signal 122 may be modulated by an inverse transform data set 155 from an inverse transform library 150. The function of the inverse transform data set may be understood by briefly considering the radar signal waveforms shown in FIG. 2.

Figure 2A:
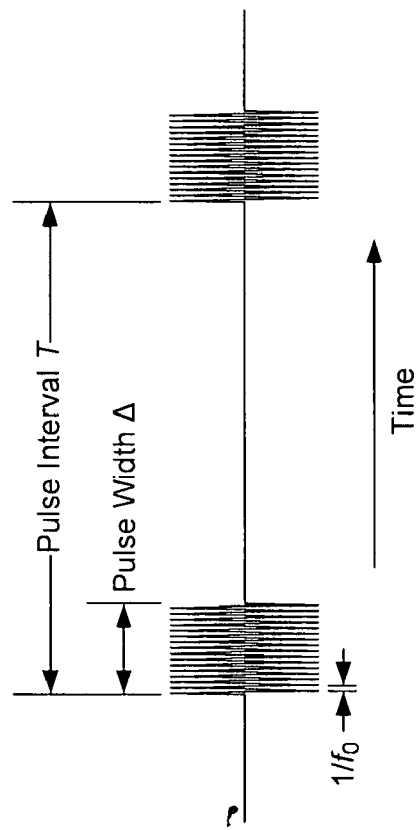
FIG. 2A is a representation of an exemplary radar signal in the time domain.

FIG. 2A shows a pulsed radio-frequency waveform which may be representative of the waveform transmitted by a conventional radar system. The pulsed radio-frequency waveform may be comprised of periodic pulses of RF energy having a fundamental frequency $f_0$. The fundamental frequency $f_0$ may be, for example, in the microwave or millimeter wave portion of the electromagnetic spectrum. Each pulse may have a pulse width $\Delta$ and the period between the start of successive pulses may be T. The pulses may also be defined by a pulsed repetition rate (PRF) which is the inverse of the period T.

Figure 2B:
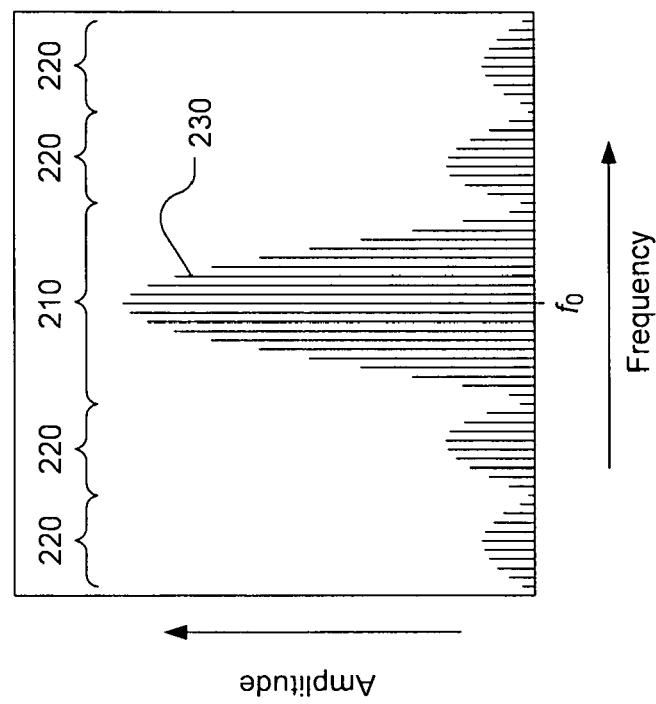
FIG. 2B is a representation of the magnitude of an exemplary radar signal in the frequency domain.

FIG. 2B shows the spectral content, or spectrum, of the pulsed radio-frequency waveform of FIG. 2A, which may be determined by taking a Fourier transform of the waveform shown in FIG. 2A. The spectrum of the pulsed radio-frequency waveform may have a complex structure consisting of a plurality of narrow frequency components such as frequency component 230 bounded by an envelope including a primary "lobe" 210 and a plurality of "side lobes" 220. The shape of the lobes 210, 220 and the spacing of the frequency components may be determined by the fundamental frequency $f_0$, the pulse width $\Delta$ and the period T of the pulsed radio-frequency waveform.

FIG. 2A and FIG. 2B illustrate a basic pulsed radar waveform. More complex waveforms may be used. For example, the amplitude, phase, and/or frequency of the signal may be varied during each pulse.

In a conventional radar system, the transmitter may transmit a pulsed radio-frequency signal, such as that shown in FIG. 2A, and the receiver may receive a return signal scattered, or reflected, from a target. Each of the frequency components of the transmitted signal, as shown in FIG. 2B, has a different wavelength. Some of the frequency components of the transmitted signal may be strongly reflected due to resonances within the target. For example, a target including a conductive element with a length L may strongly reflect a signal having a wavelength of 4L due to resonance of the conductive element. Reflections from resonant elements within a target may be relatively independent of the aspect angle at which the radar signal impinges upon the target.

In addition, each of the frequency components of the transmitted signal may reflect from multiple features of the target. Multiple reflections of each frequency component will sum coherently, such that some frequency components of the received signal may have a different relative amplitude and phase compared to the corresponding component of the transmitted signal. The coherent sum of multiple reflected signal components may be highly dependent on aspect angle at which the radar signal impinges upon the target.

Thus a target may effectively transform a transmitted pulsed radio-frequency signal into a return signal that contains information indicative of both the structure and orientation of the target.

The relationship between the transmitted and returned signals may be described as $$R(t)=T_{k,\Theta}(P(t)),$$

where P(t) is a transmitted pulsed radio-frequency signal, R(t) is a received return signal, and $T_{k,\Theta}$ is a function describing the transform performed as the transmitted signal is reflected from the target. The transform function $T_{k,\Theta}$ may be unique to a specific target k and a specific aspect angle $\Theta$. The transform function $T_{k,\Theta}$ may not be definable by a closed mathematical expression, but may be determined from reference images for the target k at aspect angle $\Theta$.

An inverse transform, or mirror-image, signal $T^{-1}_{k,\Theta}(t)$ is defined such that the following relationship holds:

$$T_{k,\Theta}(T^{-1}_{k,\Theta}(t)) \approx P(t).$$

Thus an inverse transform signal is a time-varying waveform that, when transmitted from a radar system, is transformed upon reflection from a specific target at a specific aspect angle into a return signal that is similar to a pulse waveform. More specifically, an inverse transform signal is a time-varying waveform that, when transmitted from a radar system and reflected from a specific target at a specific aspect angle, forms a return signal that is an autocorrelation function with a single detectable correlation peak.

Referring back to FIG. 1, each inverse transform data set stored in the inverse transform library 150 may be adapted to modulate a carrier wave signal to produce an associated inverse transform signal. The inverse transform library may store a plurality of inverse transform data sets representing a multiplicity of reference targets at various aspect angles. For example, a radar system intended for detecting weapons concealed upon a person might store a total of 1800 inverse transform data sets representing 50 different potential targets, each at 36 aspect angles. The transmitter 120 may transmit a signal modulated by each of the inverse transform data sets in sequence. To improve the performance of the receiver 130 and detector 140, the transmitter 120 may transmit the signal modulated by each of the inverse transform data sets multiple times, for example 10 times or 20 times, in succession, allowing the receiver 130 and/or the detector 140 to average the multiple return signals for improved signal-to-noise ratio. For further example, the 1800 different inverse transform signals may each be transmitted 20 times in succession for a total of 36,000 transmitted pulses for each cycle through the content of the transform library 150. In this example, a transmitter having a PRF of 36 kHz may cycle through the content of the transform library in 1 second. Another transmitter with a higher PRF of 100 kHz may cycle through the content of transform library nearly 3 times per second.

The number of inverse transform data sets may be optimized by applying known analytical techniques, such as disclosed in U.S. Pat. No. 5,947,413 for selecting maximum average correlation height filters, to select transform data sets particularly suited to distinguishing between a plurality of different targets.

The use of polarization on transmit and receive may enhance the capability of the system for identifying targets 100 to identify targets and may reduce the number of false recognitions. Thus the inverse transform library 150 may include inverse transform data intended to be transmitted in a specific polarization state, and the transmitter 120 and/or receiver 130 may include means (not shown in FIG. 1) to select the polarization state of the transmitted and received signals.

The inverse transform library 150 may store a large plurality of inverse transform data sets, each representing a specific reference target at a specific aspect angle. The number of reference targets may be more or less than 50, and the number of aspect angles per reference targets may be more or less than 36. The number of target types, the number of aspect angles per target type, and the radar frequency, pulse width, and PRF may be tailored to the application of the radar system. For example, a radar system to detect concealed personal weapons at close range may need sub-second response and thus may limit the number of inverse transform data sets or require a high PRF transmitter. Conversely, a radar system for detecting vehicles at a long distance may allow several seconds for target recognition and thus accommodate more inverse transform data sets.

The radar frequency may be selected such that the wavelength of the transmitted signal is comparable to the feature size of the targets of interest. For example, a radar system to detect concealed personal weapons may transmit a signal in the Ka band (approximately 11 mm wavelength) or W band (approximately 3 mm wavelength) portions of the electromagnetic spectrum. Conversely, a radar system for detecting vehicles may transmit a lower frequency, longer wavelength signal which may be, for example, in the X band portion of the electromagnetic spectrum (approximately 3 cm wavelength).

The inverse transform library 150 may be organized as a tiered or tree structure. For example, the radar system 110 may first transmit a first plurality of inverse transform signals based on a first group of higher level inverse transform data sets. The signals returned in response to the first plurality of transmitted signals may be used to select a second group of one or more lower-level inverse transform data sets. The radar system 110 may then transmit a second plurality of inverse transform signals based the second group of lower level inverse transform data sets. The final decision on the presence and/or type of target may be based on the signal returned from the second plurality of transmitted signals. For further example, the higher level inverse transform data sets may represent targets at coarsely-spaced aspect angles, such as 90-degree intervals, and the lower level inverse transform data sets may represent the targets at aspect angles at finer angular intervals. The inverse transform library may be organized in a structure having more than two tiers.

Each inverse transform data set stored in the inverse transform library 150 may be determined from a reference image of a known reference target at a known aspect angle. A reference image library 160 may include reference images for all of the anticipated targets at a plurality of aspect angles. Each reference image in the reference image library may be essentially a return signal received from the reference target when the reference target is illuminated by a known transmitted pulse signal at a known aspect angle under controlled experimental conditions. The controlled conditions may ensure, for example, that the reference image is free of clutter and noise.

In the case of relatively simple target objects, a reference image may also be obtained through simulation of the reference target object and the transmitted pulse signal. For example, a numerical model of the reference target may be created and a simulation technique such a finite difference time domain analysis may be used to compute a reference image signal that would be reflected when the target is illuminated by a known pulse signal.

Each inverse transform data set may be derived from the associated reference image by a transform extractor 165. The transform extractor 165 may, for example, transform the reference image into the frequency domain. The transform extractor 165 may then compare the amplitude and phase of the frequency components of the transformed reference image with the frequency components of the transmitted pulse signal and calculate weighting coefficients and phase shifts for some or all of the frequency components of the transmitted pulse signal. The weighted/phase-shifted frequency components may then be summed and transformed back into the time domain to provide the inverse transform signal. Other techniques, such as known techniques for developing target recognition filters for conventional radar systems in which the filters are applied to analyze a return signal, may be adapted for use in the transform extractor 165 to derive inverse transform data sets for modulating the transmitted signal in the system 100.

The reference image library 160 and the transform extractor 165 may be separate from or a portion of the radar system 110. The reference image library 160 may be populated with reference images off-line to the radar system 110, and the inverse transform data sets extracted by the transform extractor 165 may be up-loaded into the transform library 150 within the radar system 110.

The detector 140 may receive a received signal 135 from the receiver 130. The detector 140 may determine if a target has been detected. The detector 140 may average or otherwise combine the received signal 135 for multiple transmission of the same inverse transform signal. The detector 140 may consider the amplitude, pulse width, and other characteristics of the received signal 140 or the averaged received signals to determine if a target corresponding to the reference target corresponding to the inverse transform signal being transmitted has been detected within the scene. In this description, the term "detected" has the meaning of "judged to be sufficiently the same according to at least one detection criteria". The detector 140 may use one or more fixed detection criteria or one or more adaptive detection criteria to determine the similarity between the target in the scene and the reference target. For example the detector 140 may be a constant false alarm rate detector or other adaptive detector.

The output 145 of the detector 140 may be an absolute (yes/no) target detection indicating that a target that is at least similar to the reference target corresponding to a particular inverse transform data set has or has not been detected within the scene. The output 145 of the detector 140 may be a quantitative value, or score, indicating how similar a target within the scene is to the reference target corresponding to an inverse transform data set that is currently being transmitted rather than an absolute detection. The detector 140 may accumulate scores while a plurality of inverse transform waveforms are transmitted and then provide at output in the form of a ranked list of reference targets in order of similarity to a potential target within the scene.

The output 145 of the detector 140 may be used by the controller 170 to select which inverse transform data set or data sets will be transmitted. The output 145 of the detector 140 may also be displayed or otherwise communicated to an operator.

Figure 3:
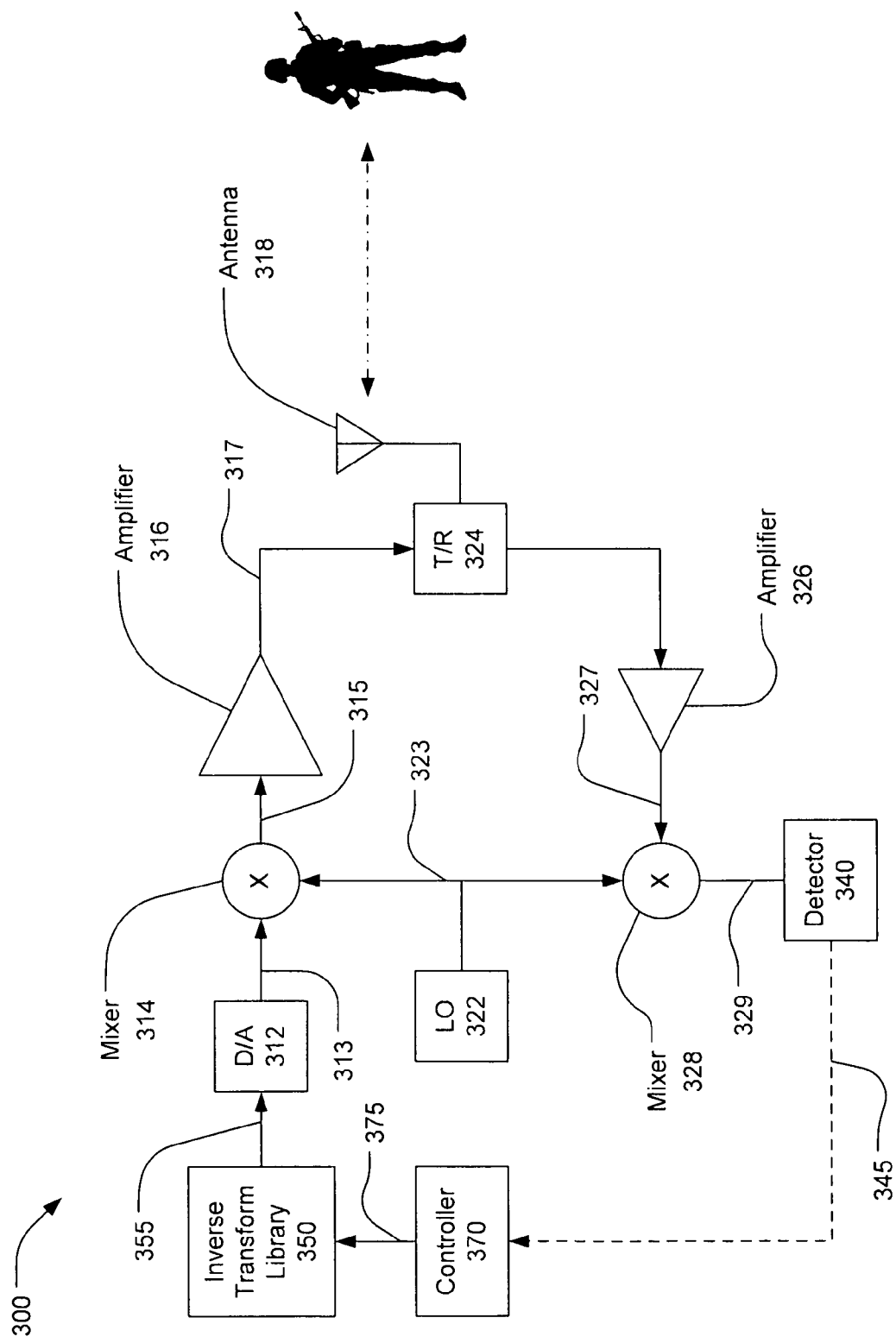
FIG. 3 is a block diagram of a radar system for identifying targets.

FIG. 3 is a simplified block diagram of an exemplary radar system 310 which may be suitable for use as the radar system 110. An inverse transform library 350 stores, in digital form, a plurality of inverse transform data sets. The inverse transform library may be one or more high speed static random access memory devices, read-only memory devices, or other memory devices. Each inverse transform data set may be read from the inverse transform library 350 in response to address and control signals provided by a controller 370. A digital-to-analog (D/A) converter 312 may convert the data read from the inverse transform library into an analog signal. The D/A converter 312 may operate at a high conversion rate, such as 1 GHz or 4 GHz or some other conversion rate. Each inverse transform data set may include a plurality of data values representing the amplitude of an inverse transform signal at regular time increments corresponding to the conversion rate of the D/A converter 312. The output of the D/A converter may be an analog signal representing the amplitude envelope of an inverse transform signal.

A first mixer 314 may multiply an RF carrier signal 323 from a local oscillator 322 and the output signal from the D/A converter 312 to form a pulsed radio frequency signal 315. The pulsed radio frequency signal 315 may be amplified by a transmit amplifier 316 and coupled to an antenna 318 through a duplexer 324. The duplexer 324 may be a circulator, a transmit/receive switch, or other circuitry to isolate the transmit signal 317 from the receive signal 325.

The return signal reflected from a target 305 may be received at the antenna 318 and coupled to a receive amplifier 326 via the duplexer 324. A second mixer 328 may multiply the amplified received signal 327 and the signal 323 from the local oscillator 322. The output 329 of the second mixer 328 may be applied to a detector 340 that determines if a target has been detected. The detector 340 may consider the amplitude, pulse width, and other characteristics of the signal 329 to determine if a target is present. The detector 340 may be a constant false alarm rate detector or other adaptive detector circuit. The output 345 of the detector 340 may be an absolute detection, a quantitative value, a score, or a ranked list.

The output 345 of the detector 340 may be used by the controller 370 to select which inverse transform data set or data sets will be transmitted. The output 345 of the detector 340 may also be displayed or otherwise communicated to an operator.

Description of Processes

Figure 4:
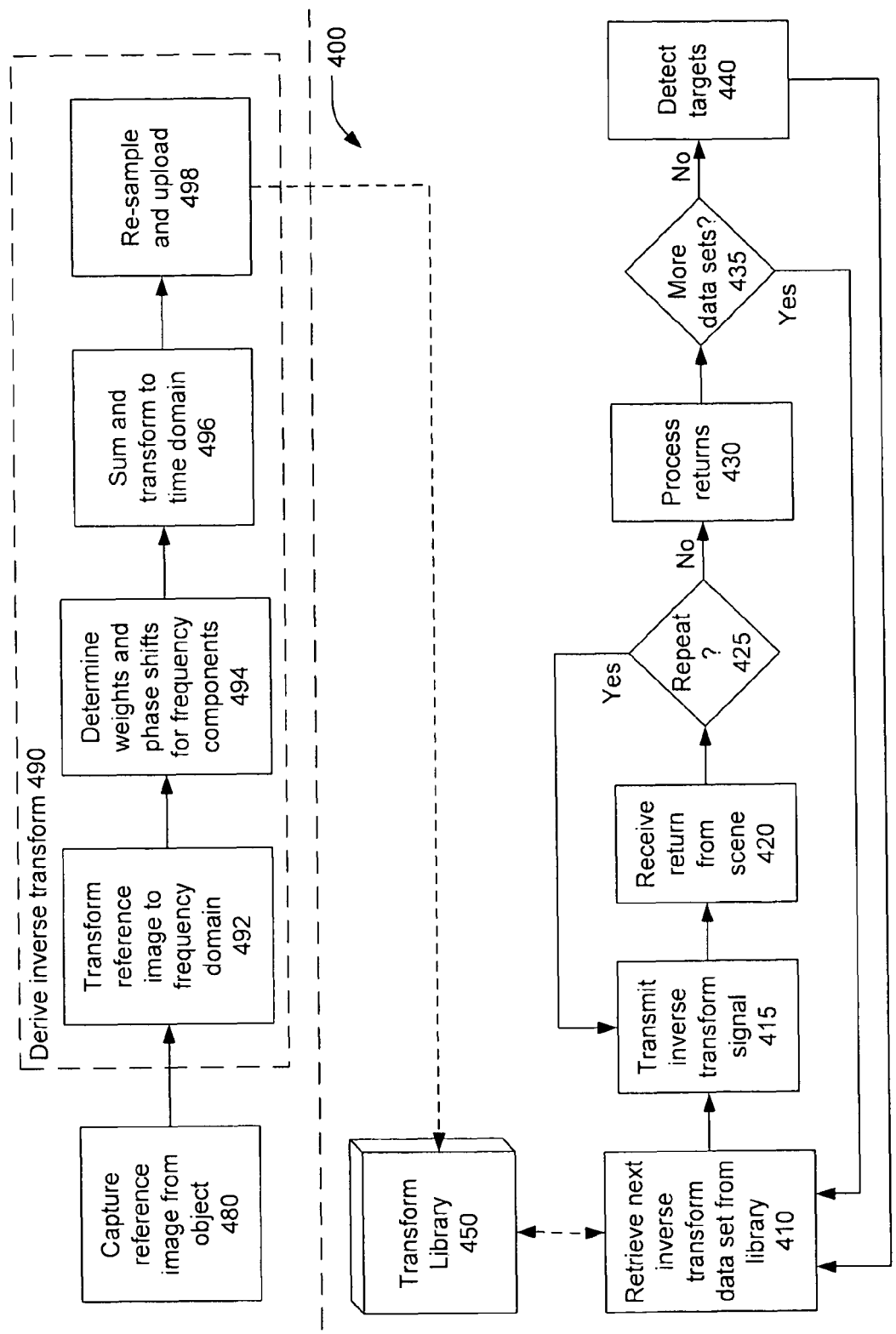
FIG. 4 is a flow chart of a process for detecting targets.

FIG. 4 is a flow chart of an exemplary process 400 for detecting targets using a radar system. At 410, a first inverse transform data set may be retrieved from an inverse transform library. The first inverse transform data set may correspond to a first specific target viewed at a first aspect angle. The first inverse transform data set may be selected from a predetermined list of inverse transform data sets, may be selected randomly from a plurality of inverse transform data sets, or may be selected in some other manner. At 415, the first inverse transform data set may be used to modulate a waveform transmitted from the radar system. At 420, the radar system may receive a return signal reflected from a scene including at least one potential target. The process 400 may loop from 425 back to 415 such that the waveform modulated by the first inverse transform data set may be transmitted a predetermined number of times. At 430, the return signals from the repeated transmissions of the waveform modulated by the first inverse transform data set may be average or otherwise combined and evaluated. The output from 430 may be, for example, a quantitative value or score indicating the similarly between a target in the scene and the first target viewed at the first aspect angle.

At 435, a determination may be made if the inverse transform library 450 contains more inverse transform data sets to be transmitted. The process 400 may repeat from 410 through 435, with a different inverse transform data set, corresponding to a different target and/or a different aspect angle, selected at 430 during each repetition. The process 400 may repeat from 410 through 435 until all of the inverse transform data sets in the inverse transform library 450 have been used. When all inverse transform data sets in the inverse transform library have been transmitted, the scores for all of the inverse transform data sets may be compared and evaluated at 440 to determine what target or targets, if any, have been detected in the scene. The results of the evaluation at 440 may be displayed or otherwise communicated to an operator. The process 400 may then restart from 410 using the first inverse transform data set.

Each inverse transform data set stored in the transform library 450 may be developed independently of the process for detecting targets 400. At 480, a reference image may be captured from a known target at a specific aspect angle. The reference image in the reference image library may be essentially a return signal received from the known target when the known target is illuminated by an ideal transmitted pulse signal under controlled conditions. The controlled conditions may ensure, for example, that the reference image is free of clutter and noise.

An inverse transform waveform may be derived from the reference image at 490. For example, the reference image may be transformed into the frequency domain at 492. The amplitude and phase of the frequency components of the transformed reference image may be compared with the frequency components of the ideal transmitted pulse signal and inverse weighting coefficients and phase shifts for some or all of the frequency components of the reference image may be determined at 494. The weighted/phase-shifted frequency components may then be summed and transformed back into the time domain at 496. The digitized signal may be re-sampled at 498 at the conversion rate of a D/A converter in the radar set that will transmit the inverse transform signal, for example the D/A converter 412 in FIG. 4. The resulting inverse transform data set may then be uploaded to the transform library 450.

Figure 5:
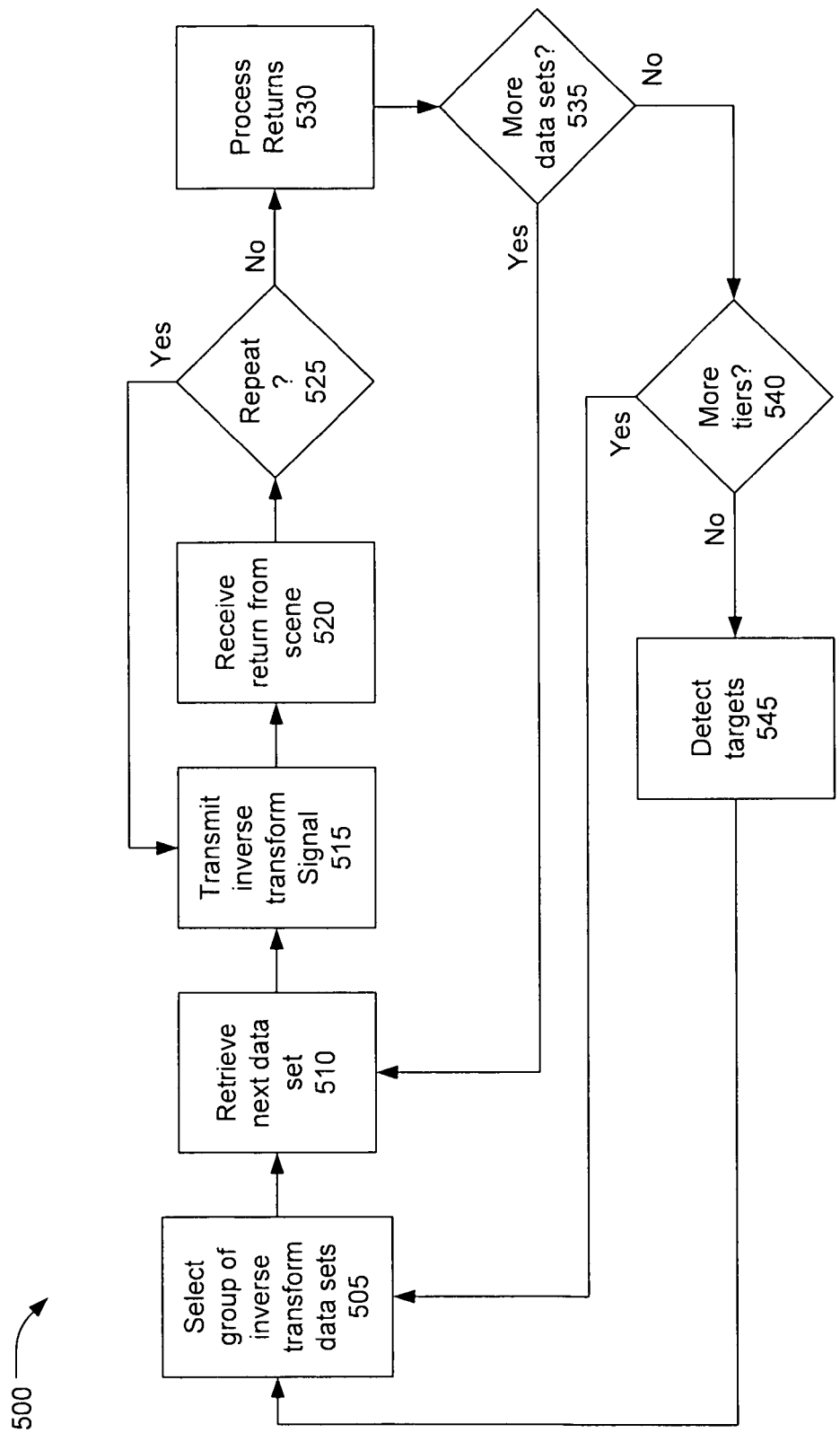
FIG. 5 is a flow chart of a process for detecting targets.

FIG. 5 is a flow chart of another exemplary process 500 for detecting targets using a radar system. At 505, a ground of inverse transform data sets may be selected from a plurality of inverse transform data sets stored in an inverse transform library (not shown). The plurality of inverse transform data sets may be organized in the inverse transform library as a tree or tiered structure, and the selected group of inverse transform data sets may represent a tree branch or tier.

The process 500 may proceed from 510 through 535 as described for the process 400 until all of the inverse transform data sets in the selected group have been used. At 540, a determination may be made if inverse transform data sets from additional tiers or levels of the library should be used. If inverse transform data sets from additional tiers or levels of the library are to be used, the process 500 may return to 505 to select another group of inverse transform data sets. The selection at 505 may be based on the results from the previous group of inverse transform data sets.

When a determination is made at 540 that no additional inverse transform data sets should be used, for example when the previous group of inverse transform data sets came from the lowest tier or smallest branch within the structure of the inverse transform library, the process 500 may proceed to 545. At 545, the scores for all of the inverse transform data sets may be compared and evaluated to determine what target or targets, if any, have been detected in the scene. The results of the evaluation at 545 may be displayed or otherwise communicated to an operator. The process 500 may then restart from 505 with the first group of inverse transform data set.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A system for detecting targets, comprising:
   a transmitter to transmit a first inverse transform signal, the first inverse transform signal derived from a reference image of a first reference target at a first aspect angle,
   a receiver to receive a return signal reflected from a scene,
   a detector to provide a detection result indicating, based on the return signal, if an object similar to the first target at the first aspect angle is detected within the scene.

2. The system for detecting targets of claim 1, further comprising:
   an inverse transform library to store a first inverse transform data set,
   a modulator to modulate a radio frequency signal with the first inverse transform data set to form the first inverse transform signal.

3. The system for detecting targets of claim 2, wherein
   the inverse transform library stores a plurality of inverse transform data sets,
   each of the plurality of inverse transform data sets is derived from a corresponding one of a plurality of reference images,
   each of the plurality of references images differs from each other of the plurality of reference images is at least one of an associated reference target and an associated aspect angle.

4. The system for detecting targets of claim 3, further comprising:

a controller to select a first group of inverse transform data sets, including the first inverse transform data set and one or more additional inverse transform data sets, wherein the first group of inverse transform data sets is used to form a corresponding first group of inverse transform signals that are transmitted in a sequence.

5. The system for detecting targets of claim 4, wherein each of the first group of inverse transform signals are transmitted for a predetermined number of times before transmitting a next inverse transform signal in the sequence.

6. The system for detecting targets of claim 4, wherein the controller selects the first group of inverse transform data sets based, at least in part, detection results from the detector.

7. The system for detecting targets of claim 4, wherein the plurality of inverse transform data sets stored in the inverse transform library is organized in a tiered structure, the controller to selects a first group of inverse transform data sets, including the first inverse transform data set and one or more additional inverse transform data sets, from a first tier of the inverse transform library, the controller selects a second group of one or more inverse transform data sets from a second tier of the inverse transform library based on detection results from the first group of inverse transform data sets.

8. A method for detecting targets, comprising:

transmitting a first inverse transform signal, the first inverse transform signal derived from a reference image of a first reference target at a first aspect angle, receiving a return signal reflected from a scene, providing a detection result indicating, based on the return signal, if an object similar to the first target at the first aspect angle is detected within the scene.

9. The method for detecting targets of claim 8, further comprising:

storing a first inverse transform data set in an inverse transform library, modulating a radio frequency signal with the first inverse transform data set to form the first inverse transform signal.

10. The method for detecting targets of claim 9, wherein the inverse transform library stores a plurality of inverse transform data sets, each of the plurality of inverse transform data sets is derived from a corresponding one of a plurality of reference images, each of the plurality of reference images differs from each other of the plurality of reference images is at least one of an associated reference target and an associated aspect angle.

11. The method for detecting targets of claim 10, further comprising:

selecting a first group of inverse transform data sets, including the first inverse transform data set and one or more additional inverse transform data sets, forming a corresponding first group of inverse transform signals from the first group of inverse transform waveforms, transmitting the first group of inverse transform signals in a sequence.

12. The method for detecting targets of claim 11, wherein the first group of inverse transform data sets are selected based, at least in part, on detection results.

13. The method for detecting targets of claim 11, further comprising:

transmitting each of the first group of inverse transform signals for a predetermined number of times before transmitting a next inverse transform signal in the sequence.

14. The method for detecting targets of claim 10, wherein the plurality of inverse transform data sets stored in the inverse transform library is organized in a tiered structure, the method further comprising:

selecting a first group of inverse transform data sets, including the first inverse transform data set and one or more additional inverse transform data sets, from a first tier of the inverse transform library, transmitting the first group of inverse transform data sets in sequence and receiving return signals, selecting a second group of one or more inverse transform data sets from a second tier of the inverse transform library based on detection results from the first group of inverse transform data sets, transmitting the second group of inverse transform data sets in sequence.

15. The method for detecting targets of claim 8, further comprising:

acquiring a reference image of the first reference target at the first aspect angle deriving the first inverse transform signal from the first reference image.

16. The method for detecting targets of claim 9, further comprising:

acquiring a plurality of reference images, each reference image differing from each other reference image in at least one of a reference target or an aspect angle, deriving a corresponding plurality of inverse transform signals and inverse transform data sets from the plurality of reference images, storing the plurality of inverse transform data sets in the inverse transform library.

* * * * *